Patented June 24, 1952

2,601,395

UNITED STATES PATENT OFFICE 2,601,395

GLASSY MOLECULARLY DEHYDRATED PHOSPHATES

George B. Hatch, Allison Park, Pa., assignor, by mesne assignments, to Calgon, Incorporated, Pittsburgh, Pa., a corporation of Pennsylvania No Drawing. Application June 29, 1944, Serial No. 542,833

1 Claim. (Cl. 23—105)

This invention relates to glassy molecularly dehydrated phosphates useful for a variety of purposes. The present application is a continuation-in-part of my application Serial No. 505,605, filed October 9, 1943, now Patent No. 2,539,305 issued January 23, 1951, which in turn is a continuation-in-part of my application Serial No. 222,258, filed July 30, 1938, now abandoned. In those applications I have disclosed a process of inhibiting the precipitation of calcium carbonate in water by flowing the water in contact with very slowly water-soluble molecularly dehydrated phosphates. In the present application I claim certain very slowly water-soluble molecularly dehydrated phosphates which are disclosed but not claimed in the above referred to copending applications.

The glassy molecularly dehydrated phosphates herein claimed have various applications in addition to their function of stabilizing water against the precipitation of calcium carbonate as disclosed in my above referred to copending applications. They may be employed to stabilize iron-bearing waters so that "red water" and objectionable deposition of hydrous ferric oxide may be obviated as disclosed in Rice Patent 2,304,850. They may also be used advantageously in the process of retarding the corrosion of metal by water as disclosed in Rice and Hatch Patent 2,337,856. The molecularly dehydrated phosphate glasses herein claimed may also be used to produce dispersion or deflocculation in suspensions of mineral matter, such as clays, pigments, fillers, and finely divided metal oxides and salts in general. One specific application for which these phosphate glasses are particularly suited is the control of the viscosity of the drilling muds.

Among the very slowly soluble molecularly dehydrated phosphate glasses which may be used according to the present invention, the following may be mentioned:

1. The glassy molecularly dehydrated zinc phosphates, as for example, zinc metaphosphate glass or zinc tripolyphosphate glass.

2. The glassy molecularly dehydrated aluminum phosphates, as for example, the glassy aluminum metaphosphate glass or aluminum tripolyphosphate glass.

3. Mixed molecularly dehydrated phosphate glasses of sodium and calcium, sodium and magnesium, or calcium and magnesium, as for example, the metaphosphate glasses or the tripolyphosphate glasses of sodium and calcium, or sodium and magnesium, or calcium and magnesium.

Glassy zinc metaphosphate may be made by heating monobasic zinc orthophosphate to dehydrate it, then fusing it at 1000° C. and then rapidly cooling it to prevent the formation of crystals. Glassy zinc metaphosphate may be made in other ways. For example, a starting mixture may be prepared from zinc carbonate and orthophosphoric acid in the proportions of 1 mol of zinc carbonate to 2 mols of the acid. This mixture is then heated to drive off the carbon dioxide and molecularly combined water at a relatively low temperature, preferably between 300° C. and 500° C. The mass is then heated to fusion which may require a temperature of 1000° C. or greater, and the fused mass is then rapidly chilled as by casting on a metal plate or metal rolls to prevent crystallization on cooling. The formation of zinc metaphosphate glass is represented by the following equation:

(1) $1ZnCO_3 + 2H_3PO_4 = 1ZnO.1P_2O_5$ 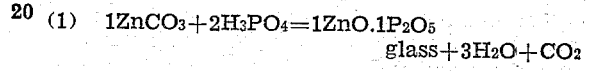
$glass + 3H_2O + CO_2$

Zinc tripolyphosphate glass may be made in the same manner as zinc metaphosphate glass except that the proportions of zinc carbonate to orthophosphoric acid are in the molar proportions of 5 to 6, the reaction being represented by the following equation:

(2) $5ZnCO_3 + 6H_3PO_4 = 5ZnO.3P_2O_5$ 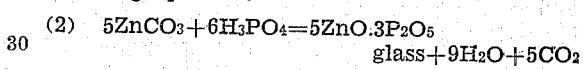
$glass + 9H_2O + 5CO_2$

Aluminum metaphosphate glass or aluminum triployphosphate glass may be made by mixing alumina and orthophosphoric acid in the proportions required to form either the metaphosphate or the tripolyphosphate, heating the mixture to drive off the molecularly combined water at a relatively low temperature, preferably at about 600° C., then heating the mass to fusion and quickly cooling it. It is much more difficult to prepare glassy aluminum metaphosphate or aluminum tripolyphosphate because of the high temperature necessary to fuse it, which is in excess of 1500° C.

Equation 3 represents the formation of aluminum metaphosphate glass, and equation 4 the formation of aluminum triopolyphosphate glass.

(3) $1Al_2O_3 + 6H_3PO_4 = Al_2O_3.3P_2O_5\ glass + 9H_2O$
(4) $5Al_2O_3 + 18H_3PO_4 =$ 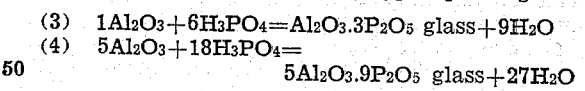
$5Al_2O_3.9P_2O_5\ glass + 27H_2O$ 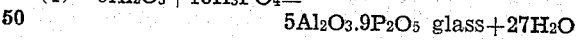

A mixed calcium-sodium water-insoluble or very slowly water soluble metaphosphate may be made by starting with a mixture of sodium carbonate, calcium carbonate, and orthophosphoric acid. The starting materials should be in the ratio of 1 mol of total carbonate to 2 mols of orthophosphoric acid. The properties of the mixed metaphosphates may be varied by controlling the ratio of sodium carbonate to calcium carbonate. Thus, if a mixed metaphosphate glass with a rate of solution greater than that of calcium metaphosphate but less than that of sodium metaphosphate is desired, 1 mol of sodium carbonate and 1 mol of calcium carbonate may be mixed with 4 mols of orthophosphoric acid and the mixture dehydrated, fused and chilled, to give a glassy product with the approximate molar composition of $$1Na_2O.1CaO.2P_2O_5$$

The reaction is represented by equation 5.

(5) $1Na_2CO_3+1CaCO_3+4H_3PO_4=$
$\quad 1Na_2O.1CaO.2P_2O_5$ glass$+6H_2O+2CO_2$ The product consists analytically of 25 molar per cent $Na_2O$; 25 molar per cent $CaO$; 50 molar per cent $P_2O_5$.

A mixed calcium-sodium water-insoluble or very slowly water-soluble tripolyphosphate glass may be made in the same manner as the mixed calcium-sodium metaphosphate glass except that the starting materials are in amounts to supply a ratio of 5 mols of total metal oxide to 3 mols of $P_2O_5$. It should be remembered that to produce 1 mol of $P_2O_5$ in the final composition, 2 mols of orthophosphoric acid would be required in the initial mixture if orthophosphoric acid were employed to supply the $P_2O_5$ in the final product. The formation of one of the many possible sodium-calcium tripolyphosphate glasses is represented by equation 6.

(6) $2Na_2CO_3+3CaCO_3+6H_3PO_4=$
$\quad 2Na_2O.3CaO.3P_2O_5$ glass$+9H_2O+5CO_2$ The product consists analytically of 25 molar per cent $Na_2O$; 37½ molar per cent $CaO$; 37½ molar per cent $P_2O_5$.

Mixed magnesium-sodium molecularly dehydrated phosphate glasses may be made with compositions corresponding to the metaphosphate or the tripolyphosphate by starting with a mixture of sodium carbonate, magnesium carbonate and orthophosphoric acid in proper proportions as described for the production of calcium-sodium molecularly dehydrated phosphate glasses and proceeding in a similar manner.

Mixed molecularly dehydrated phosphate glasses of calcium and magnesium may be made with compositions corresponding to the metaphosphate composition or the tripolyphosphate composition by mixing calcium carbonate, magnesium carbonate and phosphoric acid in the proper proportions, heating the mixture to drive off carbon dioxide and molecularly combined water at a relatively low temperature, preferably between 300° C. and 500° C., then heating the mass to fusion which may require a temperature of 1000° C. or greater, and chilling the fusion as disclosed in connection with the production of zinc metaphosphate glass. The production of one of the many possible mixed calcium-magnesium metaphosphate glasses is represented by equation 7, and the production of one of the many possible mixed calcium-magnesium tripolyphosphate glasses by equation 8.

(7) $1CaCO_3+1MgCO_3+4H_3PO_4=$
$\quad 1CaO.1MgO.2P_2O_5$ glass$+6H_2O+2CO_2$
(8) $2CaCO_3+3MgCO_3+6H_3PO_4=$
$\quad 2CaO.3MgO.3P_2O_5$ glass$+9H_2O+5CO_2$ Any suitable starting materials may be employed in the production of the metaphosphate or tripolyphosphate glasses, the only requirement being that in the production of metaphosphate glass the starting materials be in the proportions of 1 mol of total metal oxide to 2 mols of phosphoric acid or 1 mol of $P_2O_5$, while in the case of the tripolyphosphate glasses the starting materials should be in the ratio of 5 mols of total metal oxide to 6 mols of phosphoric acid or 3 mols of $P_2O_5$.

I have referred particularly in the preceding description to the production and use of the very slowly soluble metaphosphates in which the molar ratio of total metal oxide to $P_2O_5$ is 1:1 (the $P_2O_5$ accordingly constituting analytically 50 molar per cent of the composition), and the tripolyphosphates in which the molar ratio of total metal oxide to $P_2O_5$ is 5:3 (the $P_2O_5$ accordingly constituting analytically 37½ molar per cent of the composition). It will be understood, however, that glassy molecularly dehydrated phosphates of compositions intermediate the metaphosphate and tripolyphosphate may be used according to the present invention. The glassy molecularly dehydrated phosphates having compositions intermediate the metaphosphate and the tripolyphosphate may be made in the same general manner as described for the production of the metaphosphate glass and tripolyphosphate glass except that the molar ratio of total metal oxide to $P_2O_5$ is between 1:1 and 5:3 (i. e., the $P_2O_5$ constitutes analytically from 50 molar per cent to 37½ molar per cent of the composition). It is difficult to make molecularly dehydrated phosphate glasses with a molar ratio of total metal oxide to $P_2O_5$ exceeding that of 5:3 corresponding to the tripolyphosphate composition.

From equations 5 and 6 it is evident that in both the sodium-calcium metaphosphate and in the sodium-calcium tripolyphosphate, the $Na_2O$ constitutes analytically 25 molar per cent of the composition. The $CaO$ varies from 25 molar per cent in the metaphosphate to 37½ molar per cent in the tripolyphosphate. The $P_2O_5$ varies from 50 molar per cent in the metaphosphate to 37½ molar per cent in the tripolyphosphate.

The term "glassy molecularly dehydrated phosphate" as used herein is intended to include the glassy metaphosphates having a ratio of total metal oxide to $P_2O_5$ of 1:1, the glassy tripolyphosphates having a molar ratio of total metal oxide to $P_2O_5$ of 5:3, and the glassy compositions having compositions intermediate the metaphosphate and tripolyphosphate wherein the molar ratio of total metal oxide to $P_2O_5$ ranges between 1:1 and 5:3. All of these glasses are molecularly dehydrated phosphates since they may be considered as derived from orthophosphoric acid or the salts thereof by dehydration which effects an atomic rearrangement within the phosphate molecule.

I claim:

A homogeneous vitreous material as a glassy water-soluble fusion product consisting analytically of the oxides: $Na_2O$, $P_2O_5$ and $CaO$, the $P_2O_5$ being present to the extent of substantially 50 molar per cent of the total molar content of said oxides, the $CaO$ and $Na_2O$ forming the remainder of said total molar content and each being present to an extent of about 25 molar per cent of the total molar content of said oxides.

GEORGE B. HATCH.

References on following page

REFERENCES CITED

The following references are of record in the file of this patent:

UNITED STATES PATENTS

| Number | Name | Date |
|---|---|---|
| 295,410 | Knaffl | Mar. 18, 1884 |
| 1,654,404 | Blumenberg | Dec. 27, 1927 |
| 2,081,618 | Draisbach | May 25, 1937 |
| 2,142,944 | Kerschbaum | Jan. 3, 1939 |
| 2,235,955 | Williams | Mar. 25, 1941 |
| 2,304,850 | Rice | Dec. 15, 1942 |
| 2,337,856 | Rice et al. | Dec. 28, 1943 |
| 2,358,965 | Durgin et al. | Sept. 26, 1944 |
| 2,365,489 | Partridge | Dec. 19, 1944 |
| 2,370,472 | King | Feb. 27, 1945 |

OTHER REFERENCES

Huber: Z. fur Anorg. und Allgemeine Chemie, vol. 230 (1936) pages 123–128.

Treadwell et al.: Helv. Chim. Acta, vol. 20 (1937), page 931.

Andress et al.: Z. fur Anorg. und Allgemeine Chemie, vol. 237, April 1938, page 121.